United States Patent
Wall

[19]
[11] Patent Number: 6,111,825
[45] Date of Patent: Aug. 29, 2000

[54] AUTOMOTIVE SOUND SYSTEM PROVIDING SIMPLIFIED PLAY LISTS

[75] Inventor: Holger Wall, Hannover, Germany

[73] Assignee: Robert Bosch GmbH, Stuttgart, Germany

[21] Appl. No.: 09/166,451

[22] Filed: Oct. 5, 1998

[30] Foreign Application Priority Data

Oct. 11, 1997 [DE] Germany ............... 197 45 022

[51] Int. Cl.[7] ............................................. G11B 17/22
[52] U.S. Cl. ............................................................ 369/33
[58] Field of Search ................................. 369/7, 33, 32, 369/6, 11, 12, 47, 48, 58

[56] References Cited

U.S. PATENT DOCUMENTS

| | | |
|---|---|---|
| 4,779,252 | 10/1988 | Custers et al. . |
| 4,817,075 | 3/1989 | Kikuchi et al. . |
| 4,939,601 | 7/1990 | Endo et al. . |
| 5,450,312 | 9/1995 | Lee et al. ................................. 369/33 |
| 5,867,457 | 2/1999 | Parvulescu et al. ..................... 369/33 |
| 5,901,119 | 5/1999 | Inoue ....................................... 369/32 |

FOREIGN PATENT DOCUMENTS

| | | |
|---|---|---|
| 41 21 698 C1 | 6/1991 | Germany . |
| 2 234 105 | 1/1991 | United Kingdom . |

OTHER PUBLICATIONS

Blaupunkt catalogue, "Soung– und Fahrvergnügen pur. Mobile Kommunikation von Blaupunkt", Bosch Gruppe, Pogramm '96/'97, pp. 18, 53. *No Month Available.

*Primary Examiner*—Tan Dinh
*Attorney, Agent, or Firm*—Kenyon & Kenyon

[57] ABSTRACT

An automotive sound system having an electronic memory which is used for programming titles of at least one storage disk, particularly of a compact disk. When a first operating function is activated, all the titles of the storage disk that is inserted in a disk drive are identified in the memory as titles to be played. When a second operating function is activated, a currently played title of the storage disk that is inserted in the disk drive is identified in the memory as a title not to be played.

15 Claims, 2 Drawing Sheets

AUTOMOTIVE SOUND SYSTEM PROVIDING SIMPLIFIED PLAY LISTS

BACKGROUND INFORMATION

Blaupunkt catalogue, "Sound-und Fahrvergnügen pur. Mobile Kommunikation von Blaupunkt. Pogramm '96/'97", describes an electronic memory for programming the desired titles of compact discs. Such an electronic memory is implemented, for example, in the Blaupunkt automotive sound system "München RDM 126".

SUMMARY OF THE INVENTION

An automotive sound system of the present invention has the advantage that an extensive play list is created in a simple manner requiring little expenditure of time and energy by the user, and is able to be stored in the memory. In this manner, ease of operation for the user is increased, and the operating process for storing all the titles in the memory is accelerated, so that each title no longer has to be stored separately. Moreover, this increases traffic safety, since the user is less distracted from the traffic situation.

It is advantageous to provide a second operating function which, when activated, causes a currently played title of the storage disk that is inserted in the disk drive to be identified in the memory as a title not to be played. In this manner, operation for the user is simplified for the case when the majority of the titles on the storage disk are to be played, so that only a relatively small number of control operations is necessary to remove the unwanted titles on the storage disk from the play list in the memory.

It is also advantageous to provide a third operating function which, when activated, causes all titles of the storage disk that is inserted into the disk drive to be identified in the memory as titles not to be played, with the exception of a currently played title. In this manner, operation for the user is simplified for the case when the majority of the titles on the storage disk are not to be played, so that only a comparatively small number of desired titles has to be input into the play list in the memory.

It is also advantageous to provide exactly one operating control element, by whose actuation, at least two of the operating functions are able to be activated, an operating function being selected as a function of the actuation duration of the operating control element. In this manner, space is saved on the front control panel of the automotive sound system, and functional clarity of the panel is increased for the user. In addition, by using only one operating control element for a plurality of operating functions, material costs are saved for further operating control elements, and production outlay is reduced.

DETAILED DESCRIPTION

Figure 1:
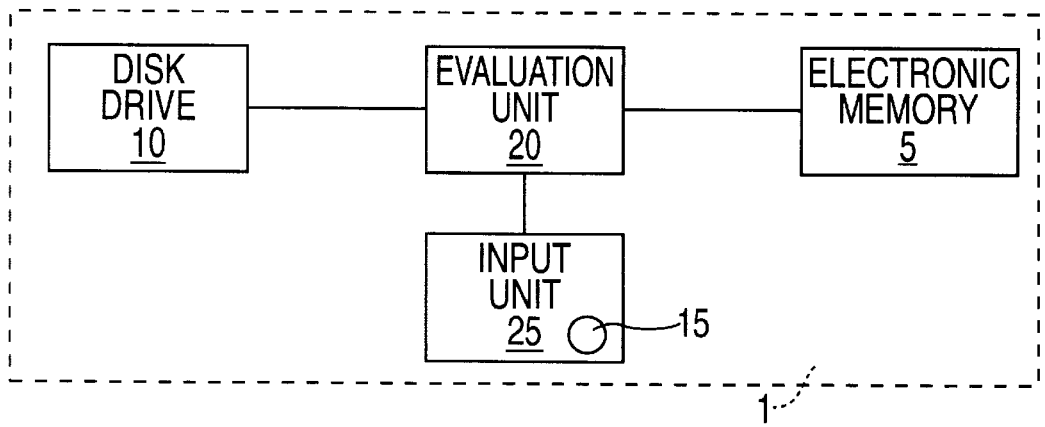
FIG. 1 shows a block diagram of an automotive sound system according to the present invention.

FIG. 1 shows an automotive sound system 1 which includes an electronic memory 5, a disk drive 10, an evaluation unit 20, and an input unit 25. Further structural components of automotive sound system 1 that are not essential for the present invention are not shown in FIG. 1. Memory 5, disk drive 10 and input unit 25 are each connected to evaluation unit 20. Input unit 25 includes at least one operating control element 15 which, for example, can be designed as a momentary-contact switch. Disk drive 10 can also be arranged outside of automotive sound system 1 and be connected, for instance, via an interconnection cable to evaluation unit 20. In this context, disk drive 10 can be a compact-disk player, to which a compact-disk changer can also be allocated.

However, disk drives for any other storage disks of a magnetic and/or optical type, such as for CD-ROM's, digital video disks, "mini disks" or the like, are also possible for implementing the automotive sound system of the present invention.

Figure 2:
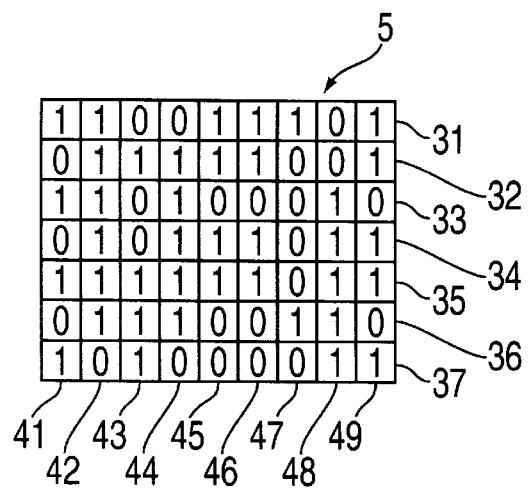
FIG. 2 shows an exemplary table for compact-disk play lists stored in an electronic memory of the automotive sound system illustrated in FIG. 1.

Memory 5 can be designed as an EE-PROM (electrically erasable programmable read-only memory), and permits the storage of "play lists" 31, . . . ,37 for, in each case, one storage disk, constructed as a compact disk in this exemplary embodiment shown in FIG. 2. In FIG. 2, memory 5 is shown with 7 play lists 31, . . . ,37, which offers the possibility of storing one play list for each of seven compact discs. According to the example shown in FIG. 2, each play list includes nine storage locations 41, . . . ,49 for compact disks having up to nine titles. For compact disks having more than nine titles, correspondingly more than nine storage locations per play list are provided in memory 5. If a compact disk has fewer than nine titles, storage locations not needed in the corresponding play list of memory 5 remain free, or are utilized for other play lists. For example, first storage location 41 corresponds in each case to the first title of the corresponding compact disk, the second storage location corresponds, for instance, to the second title of the corresponding compact disk, etc.

In the example shown in FIG. 2, a title to be played is indicated digitally by a logic "one" on the corresponding storage location, and a title not to be played is indicated digitally by a logic "zero" on the corresponding storage location, in each case by one bit. Thus, for instance, according to first play list 31, the first, the second, the fifth, the sixth, the seventh and the ninth titles are to be played from the associated compact disk. At the same time, the remaining titles of this compact disk are not to be played. The titles to be played in conformance with a play list, after inserting the associated compact disk into disk drive 10, are then played one after the other in their sequence in a first operating mode provided for that purpose. In a second operating mode, the play lists of memory 5 are ignored, and each title of the corresponding compact disk is played. If a play list is to be filed in memory 5 for a compact disk inserted into disk drive 10, then the determined total playing time and number of titles of the compact disk are stored in a storage area not shown in FIG. 1, and linked to the storage locations made available in memory 5 for the play list to be created. In this manner, the compact disk, after removal from disk drive 10, later reinsertion into disk drive 10, ascertainment once again of the total playing time and number of titles, and appropriate comparison to the data filed in the further storage area not shown, can be assigned to the appertaining play list, so that the titles selected for this compact disk are played.

In the process, the determination of the total playing time and the number of titles of a compact disk inserted into disk drive 10, and the comparison to further data filed in the storage area not shown, is conventionally carried out in evaluation unit 20. The playing or suppression of individual titles on a compact disk inserted into disk drive 10 is likewise brought about by evaluation unit 20 as a function of the associated play list stored in memory 5. The first operating mode, in which only the titles of a compact disk inserted into disk drive 10 are played which were also selected for playing according to the associated play list in memory 5 and are indicated there by a logic "one", can only be set when an associated play list has also been discovered in memory 5 for the compact disk inserted into disk drive 10. If no associated play list is discovered in memory 5, then the second operating mode is automatically set by evaluation device 20, in which all the titles of the compact disk are played in turn.

Figure 3:
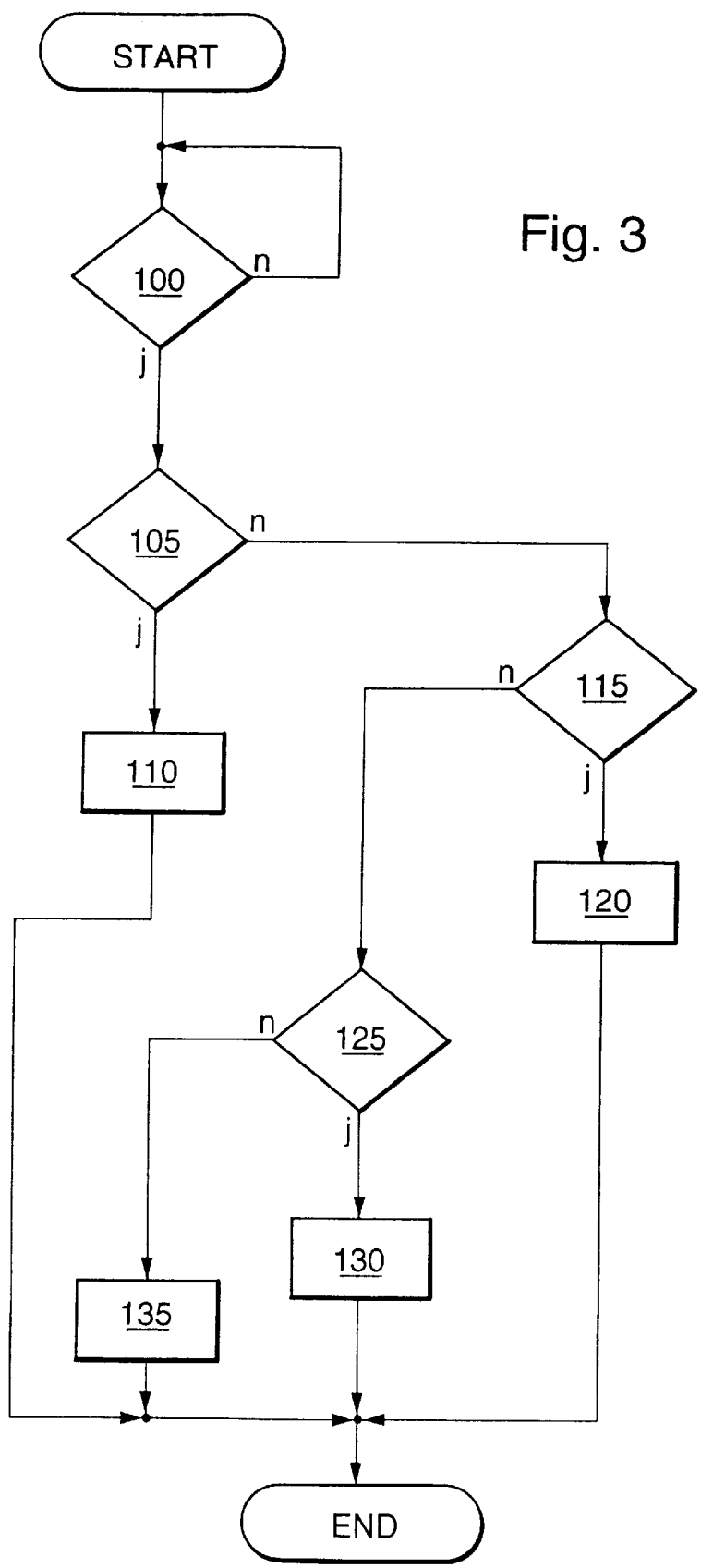
FIG. 3 shows a flow chart for an activation of various operating functions in the automotive sound system.

FIG. 3 shows a flow diagram for the functioning method of evaluation unit 20. At a program point 100, it is checked whether operating control element 15 has been pressed. If this is the case, a jump is made to program point 105, otherwise there is a jump back to program point 100. At program point 105, a check is made as to whether the actuation duration pf operating control element 15 was below a first predefined value of, e.g., 2 seconds. If this is the case, a jump is made to program point 110, otherwise there is a jump to program point 115. At program point 110, the first operating mode is set by evaluation unit 20. The program part is subsequently exited. At program point 115, it is checked whether the actuation duration of operating control element 15 falls below a second predefined value of, e.g., 4 seconds. If this is the case, there is a jump to program point 120, otherwise a jump is made to program point 125. At program point 120, a first operating function is activated, which causes all titles of the compact disk that is inserted in disk drive 10 to be identified in the associated play list in memory 5 as titles to be played, so that in each case, a logic "one" occupies the corresponding storage locations.

For the case when a play list does not yet exist in memory 5 for the compact disk inserted into disk drive 10, a new play list is created, provided there is still storage space in memory 5. Otherwise, evaluation unit 20 causes a display to appear on a display device, not shown in FIG. 1, to inform the user that the memory is full. For the case when a play list already exists in memory 5 for the inserted compact disk, the storage locations for the titles of the inserted compact disk are in each case overwritten with a logic "one", if they are not already denoted by a one. After program point 120, the program part is exited. At program point 125, it is checked whether the actuation duration of operating control element 15 falls below a third predefined value of, e.g., 6 seconds. If this is the case, a jump is made to program point 130, otherwise there is a jump to program point 135. At program point 130, a second operating function is activated by evaluation unit 20, which causes a currently played title of the compact disk that is inserted in disk drive 10 to be identified in memory 5 as a title not to be played, the corresponding storage location of the associated play list being denoted with a logic "zero". However, this is only possible if a play list exists in memory 5 for the inserted compact disk.

Otherwise, the actuation of operating control element 15 has no effect which, if desired, can likewise be displayed for the information of the user by an appropriate indication on the display device, not shown in FIG. 1. After program point 130, the program part is exited. At program point 135, a third operating function is activated, which causes all the titles of the compact disk inserted in disk drive 10 to be identified in memory 5 as titles not to be played, with the exception of a currently played title. In the process, the currently played title is denoted on the corresponding storage location of the associated play list with a logic "one", the remaining titles of the associated play list are each denoted on the corresponding storage locations with a logic "zero". In this connection, the third operating function can likewise only be activated if a play list is provided in memory 5 for the compact disk inserted into disk drive 10. Otherwise, the operation of operating control element 15 has no effect. The user can likewise be informed of this on the display device not shown in FIG. 1.

Moreover, in all the cases described, where no play list exists in memory 5 for a compact disk inserted into disk drive 5, but there is still storage space in memory 5 for creating a new play list, a new play list is created automatically for the compact disk just inserted, and the total playing time and the number of titles of this compact disk are stored in the further storage area, not shown in FIG. 1, for a later linkage of the compact disk just inserted into disk drive 10 to the associated play list in memory 5. During this initialization process, the play list is then furnished with the title indications which are allowed for in conformance with the selected operating function, in the case of the second operating function, only the currently played title being identified as a title not to be played, and the remaining titles being designated, for example, in any way desired. After program point 135, the program part is likewise exited.

In addition to the operating functions described above, further operating functions can be implemented using operating control element 15 and further predefined actuation durations. In this context, provision could be made for a fourth operating function which, when activated, causes a currently played title of the compact disk that is inserted in disk drive 10 to be identified in memory 5 as a title to be played, and the corresponding storage location of the associated play list in memory 5 to be denoted with a logic "one". Provision could furthermore be made for a fifth operating function which, when activated, results in deletion in memory 5 of the play list allocated to the compact disk just inserted. In addition, a sixth operating function could be provided which, when activated, causes all play lists in memory 5 to be deleted. In the event that, given activation of the fourth operating function, no play list is allocated in memory 5 to the compact disk just inserted in disk drive 10, no action is carried out or, optionally, an appropriate indication appears on the display device, not shown in FIG. 1, for the information of the user. Furthermore, as already described above, in the event there is still sufficient storage capacity in memory 5, a new play list could be created for the compact disk just inserted into disk drive 10, during which the storage location of the currently played title would be indicated with a logic "one", and the remaining storage locations of the play list would be denoted, for example, in any way desired.

The various operating functions can also be activated by a plurality of operating control elements on the input unit 25 of automotive sound system 1, an operating function no longer having to be selected as a function of the actuating duration of the respective operating control element when, in each case, one operating control element is used per operating function. A separate cancel key can also be provided for deleting play lists. Thus, it may be possible to delete either a current play list or all play lists from memory 5 depending on the actuating duration. When deleting one or more play lists, in each case the appertaining total playing time and number of titles are also deleted in the further storage area, not shown in FIG. 1, and thus the assignment to the compact disk insertable into disk drive 10 is terminated. It is also possible to distribute the operating functions over one or several operating control elements, possibly utilizing different durations of actuation, according to a particular requirement.

What is claimed is:

1. An automotive sound system, comprising:
    a disk drive receiving at least one storage disk which has titles;
    an electronic memory device storing information for programming the titles of the at least one storage disk; and
    a control device,
    wherein, when a first operating function is activated, the control device identifies, in the electronic memory device, all of the titles of the at least one storage disk as first titles to be played.

2. The automotive sound system according to claim 1, wherein, when a second operating function is activated, the control device identifies, in the electronic memory device, a currently played title of the at least one storage disk as a second title not to be played.

3. The automotive sound system according to claim 2, wherein, when a third operating function is activated, the control device identifies, in the electronic memory device, all of the titles of the at least one storage disk as third titles not to be played, the third titles excluding the currently played title.

4. The automotive sound system according to claim 1, wherein, when a second operating function is activated, the control device identifies, in the electronic memory device, all of the titles of the at least one storage disk as second titles not to be played, the second titles excluding a currently played title.

5. The automotive sound system according to claim 2, further comprising:
    only one operating control element,
    wherein, when the operating control element is activated, the control device selects the first and second operating functions to be actuatable, and
    wherein the first and second operating functions are selected as a function of an actuation duration of the operating control element.

6. The automotive sound system according to claim 3, further comprising:
    only one operating control element,
    wherein, when the operating control element is activated, the control device selects at least two functions of the first, second and third operating functions to be actuatable, and
    wherein the at least two functions are selected as a function of an actuation duration of the operating control element.

7. The automotive sound system according to claim 4, further comprising:
    only one operating control element,
    wherein, when the operating control element is activated, the control device selects the first and second operating functions to be actuatable, and
    wherein the first and second operating functions are selected as a function of an actuation duration of the operating control element.

8. The automotive sound system according to claim 1, wherein the at least one storage disk is a compact disk.

9. The automotive sound system according to claim 1, wherein, when a fourth operating function is activated, the control device identifies, in the electronic memory device, a currently played title of the at least one storage disk as a title to be played.

10. The automotive sound system according to claim 1, wherein, when a fifth operating function is activated, the control device causes a play list to be deleted in the electronic memory device.

11. The automotive sound system according to claim 1, wherein, when a sixth operating function is activated, the control device causes a set of play lists to be deleted in the electronic memory device.

12. An automotive sound system, comprising:
    a disk drive arrangement that is adapted to receive at least one storage disk having a plurality of titles;
    a memory device that is adapted to store information that is used to control the playing of at least one title of the plurality of titles of the at least one storage disk;
    an input arrangement;
    a control device having a first operating mode, which uses a predefined play list in the memory device, and a second operating mode, which uses one of a first operating function, a second operating function and a third operating function based on an actuation state of the input arrangement, wherein each of the operating functions provides a different play list capability.

13. The automotive sound system according to claim 12, wherein the first operating function causes identifying information to be stored in the memory device to indicate that each of the plurality of titles are to be played.

14. The automotive sound system according to claim 12, wherein the second operating function causes identifying information to be stored in the memory device to indicate that a currently played title is not to be played.

15. The automotive sound system according to claim 12, wherein the third operating function causes identifying information to be stored in the memory device to indicate that only a currently played title of the plurality of titles is to be played.

* * * * *